Patented Dec. 15, 1931

1,836,428

UNITED STATES PATENT OFFICE

JAMES BADDILEY AND ERNEST CHAPMAN, OF BLACKLEY, MANCHESTER, ENGLAND, ASSIGNORS TO BRITISH DYESTUFFS CORPORATION LIMITED, OF BLACKLEY, MANCHESTER, ENGLAND

WETTING-OUT AGENT OR EMULSIFIER

No Drawing. Application filed May 31, 1927, Serial No. 195,585, and in Great Britain June 3, 1926.

This invention relates to a new type of wetting-out or emulsifying agent and consists in the preparation of sulphonic acids or their salts derived from the condensation products obtained by the interaction of a suitable aliphatic, alicyclic or aralkyl alcohol, with a suitable fraction of a raw or purified mineral oil, or a fraction obtained from such oil during the process of purification, or cracking. Suitable oils for our purpose are those oils or those fractions of oils which permit of sulphonation, and, as set forth in our copending application Ser. No. 205,833, filed July 14, 1927, we find it advantageous to use fractions boiling above 200°, since these fractions contain constituents which by sulphonation alone yield wetting-out agents. We are able, however, to use fractions which contain lower boiling portions, separating unsulphonated material after sulphonation and condensation as described below.

The preferred way of carrying out our invention is to sulphonate the fraction of natural petroleum which is obtained by extracting Asiatic petroleum by means of liquid sulphur dioxide and to condense the product with a saturated alcohol, for example, isopropyl alcohol, in the presence of concentrated sulphuric acid. As is well known, liquid sulphur dioxide is a solvent for aromatic hydrocarbons and unsaturated hydrocarbons rich in carbon, the naphthenes and paraffin hydrocarbons being only difficultly soluble in this medium. Alternatively the petroleum fraction may be condensed with the alcohol using a suitable agent and the resulting product then sulphonated. The product obtained is most probably a complex mixture of sulphonic acids. It may be isolated by treatment with lime and conversion into a salt, for example, the sodium salt, or it may be left in the form of free acid.

The new products exhibit in an extraordinary degree the properties of "wetting-out" agents. When added to an aqueous liquid they enable it to penetrate textile fibers rapidly and evenly; or when added to dyestuff powders they facilitate solution or admixture with water and prevent balling and the floating of the dry powder on the surface of the water. Our new products are thus eminently suitable for adding to dyes or dye mixtures intended for home dyeing, since they facilitate the making up of the dye bath, assist penetration of the textile by the dye solution and thus enable even an unskilful dyer to obtain good level results. Our products may also be added to powdered or pasted intermediates intended for dyeing processes, for example to $\beta$- hydroxynaphthoic arylides, to p-nitroaniline, to p- phenylenediamine and other fur dyeing bases, etc. They may also be added to bleaching liquors or may be incorporated with sodium perborate and the like in the from of powder, paste or solution.

The remarkable wetting-out properties of our products render them suitable for many other similar applications in which the object is to secure a rapid wetting and penetration of textile materials. The products are applicable in the treatment of new calico and other finished textiles with aqueous liquids, in filtering through new filter cloth, in the treatment of cheap towelling in order to overcome its repellent action towards water, and in printing pastes to secure penetration. A special advantage of our products is that, as the free acids and also the calcium and many other salts are soluble in water, they are effective in the presence of acid, lime, or the like.

Our products may also be used to assist the degreasing of wool.

The wetting-out compositions of the present invention may be used alone or in admixture with other substances or materials. For example, the materials of the present invention may be mixed with powdered or pasted ingredients or incorporated with sodium perborate or the like. They may be impregnated in textile materials or in raw wool.

The following examples are given as illustrative of the method of manufacturing our product and some of the ways in which it may be applied. The parts are by weight.

Example 1

84 parts of a petroleum fraction obtained by the usual commercial process of extracting Borneo petroleum with liquid sulphur dioxide, and having a boiling range of 150°–300° C., are added to 92 parts of monohydrate sulphuric acid and maintained at a temperature of 60–65° C. for 3 hours with stirring. The temperature is then raised to 120–130° C. and a mixture of 76 parts isopropyl alcohol and 53 parts of sulphuric acid 96 per cent is added in the course of thirty minutes. After heating for about three hours longer, the reaction is completed. Insoluble oil is separated, and the product is isolated by adding lime and converting into the sodium salt in the usual manner. After evaporation to dryness and grinding, the product is a light grey powder easily soluble in water, and showing, even at a dilution below ½ per cent, remarkable wetting-out properties.

Example 2

63 parts of the petroleum fraction used in Example 1 are added in the course of one hour to 68 parts of monohydrate of sulphuric acid (101.5 per cent) with stirring, and the temperature is maintained at 60–65° C. during 3 hours. After allowing to cool and settle, unsulphonated oil (about 20 parts) is separated. The remaining sulphonation mixture is warmed to 100–105° C. and a mixture of 18 parts isopropyl alcohol and 15 parts sulphuric acid is added in the course of ten minutes with stirring under a reflux condenser. Heating at 100–105° C. is continued for 3 hours. After cooling, the mixture is poured into water, neutralized with lime and the product isolated as a sodium salt after treatment with a sodium carbonate in the usual manner. About 72 parts of a brownish grey powder are obtained, which possesses wetting-out properties similar to the product described in Example 1.

Example 3

The isopropyl alcohol of Example 1 may be replaced by an equal quantity of normal propyl alcohol; or by 95 parts of isobutyl alcohol; or by 136 parts of benzyl alcohol or by 125 parts of cyclohexanol. In each case the method of procedure is the same as in Example 1, and products possessing pronounced wetting-out properties are obtained.

Example 4

84 parts of the petroleum fraction known in the cracking process as "recharging stock" (b. p. approx. 195–250° C.) are sulphonated with monohydrate of sulphuric acid and condensed with isopropyl alcohol as described in Example 1. The product, isolated as the sodium salt, possesses good wetting-out properties.

Example 5

The method of procedure described in Example 1 may be modified as follows. A mixture of 42 parts of the extract of high boiling Asiatic petroleum described in Example 1 and 38 parts of isopropyl alcohol is added in the course of about one hour to 74 parts of monohydrate of sulphuric acid with stirring under a reflux condenser. After one hour, the mixture is heated at 60–65° C. for 3 hours, and finally at 125–130° C. for 3 hours. The mixture is then poured into water, insoluble oil is separated, and the aqueous liquor is worked up in the usual way by treatment with lime and sodium carbonate, and the sodium salt is isolated by evaporation. The product possesses good wetting-out properties.

Example 6

44 parts of Roumanian white spirit (b. p. 110–230° C.) are added to 46 parts of monohydrate of sulphuric acid (101.5 per cent) and sulphonated during 3 hours at 60–65° C. Unsulphonated oil (14 parts) is removed, and a mixture of 12 parts isopropyl alcohol and 10 parts of $H_2SO_4$ (95 per cent) is added at 100–105° C. The condensation is completed after 3 hours at this temperature, and the product is worked up as in the previous examples. The sodium salt gives an almost colorless solution possessing remarkable wetting-out properties in 1 per cent concentration.

Example 7. Use as penetrating agent in dyeing 100 parts of wool are entered into a lukewarm dye-bath containing 1 part of Alizarine Sky Blue B, 0.05 part of the product of Example 1, 10–15 parts of Glauber's salt, and 2 parts of sulphuric acid, and the bath raised to boiling temperature. After boiling for half-an-hour a further 2 parts of sulphuric acid, suitably diluted, are gradually added, boiling being continued for an hour longer. The wool, after rinsing and drying, is found to be dyed evenly throughout.

Example 8. Use in printing paste

A paste is made up as follows:—
2 parts of Durindone Red 3B powder, and 1 part of the product of Example 1 are pasted with 7 parts of water, and added to 6.3 parts of British gum solution (containing 30 per cent of dry British gum).

Of this mixture 80 parts are mixed with 5 parts of glycerine, 4 parts of caustic soda solution (76° Tw.), 5 parts of soda ash, 5 parts of potassium carbonate, and 8 parts of Formosul. The whole is warmed at 55° C. on a water bath for 15 minutes, cooled, and printed on white cloth, which is then steamed and treated in the usual manner for printings with vat colors.

Example 9. Use with dye powders etc.

100 lbs. of p-nitroaniline are sprinkled with a solution containing 2 to 8 ounces of the product of Example 1. The mixture may be used immediately, or may be dried for future use. In either case the powder "wets out" immediately on the application of water.

100 lbs. of β-hydroxynaphthoic anilide, p-phenylenediamine, indigo powder, etc. may be substituted for the p-nitroaniline in this example, with equal effect.

*Example 10. Use in preparation of a dye-bath from a dye in powder form*

One part of the product of Example 1 is incorporated with 1,000 parts of Lissamine Fast Yellow 2G or of Chrysophenine G.

The mixture is found to dissolve quickly in water without showing any tendency to "ball" or to float on the surface of the liquid.

*Example 11. Dye preparation for home use*

A dry mixture is made up from 1.5 parts of Chlorazol Fast Helio BK, 0.75 part of Coomassie Violet R, 0.04 part of Disulphine Blue A, 10–15 parts of Glauber's salt, 0.05 part of the product of Example 1.

The mixture is sufficient to dye 100 parts of material a mauve shade.

*Example 12. Preparation of filter-cloth*

During or after manufacture the filter-cloth is allowed to soak up a 4 per cent solution of the product of Example 1, the quantity of solid product used being from 0.1 per cent to 0.5 per cent of the weight of the cloth. The cloth is then dried and is ready for use in the filtration of aqueous liquids without any preliminary boiling.

Alternatively the product of Example 1 in the form of a 1 per cent solution may be passed through a filter-press containing new unboiled filter-cloth, and followed later by the aqueous mixture to be filtered. Or 1 per cent of our product may be added to the first portions of the aqueous liquid to be filtered. In all cases the filter-cloth is wet immediately.

The various examples given are merely for the purpose of illustrating the principles of our invention.

What we claim and desire to secure by Letters Patent is:—

1. The process of manufacturing a wetting-out agent from mineral oil fractions boiling between 150 and 300° C. which are capable of sulphonation which comprises sulphonating the oil and condensing with an alcohol.

2. The process of manufacturing a wetting-out agent from mineral oil fractions boiling between 150 and 300° C. which are capable of sulphonation which comprises sulphonating the mineral oil fraction and condensing with an aliphatic alcohol.

3. The process of manufacturing a wetting-out agent from mineral oil fractions, having a boiling range between 150 and 300° C. and which are capable of sulphonation which comprises sulphonating the mineral oil fraction and condensing with isopropyl alcohol.

4. The process of manufacturing a wetting-out agent from a fraction of Borneo petroleum extracted with liquid $SO_2$, boiling between 150 and 300° C. which comprises sulphonating the fraction with monohydrate sulphuric acid, and condensing with isopropyl alcohol.

5. As a new composition of matter, a sulphonated alcohol condensation product of a petroleum fraction, said petroleum fraction having a boiling range between 150 and 300° C. and containing a relatively large amount of compounds capable of being sulphonated, the said condensation product having wetting-out properties, and being soluble in water both in the form of the free acid and as calcium and alkali metal salts thereof.

6. As a new composition of matter, the sulphonated alcohol condensation product of petroleum extracts, having a boiling range of 150 to 300° C., sulphonated and condensed with isopropyl alcohol, which is soluble in water and in acids, and is also soluble in water in the form of its calcium and other salts, and possesses wetting-out properties even at a dilution below ½ per cent.

7. The process of manufacturing a wetting out agent from a petroleum fraction extracted with sulphur dioxide and boiling between 150 and 300° C., which comprises sulphonating the fraction with sulphuric acid and condensing with an alcohol.

8. As a new composition of matter, a sulphonated alcohol condensation product of a petroleum fraction extracted with sulphur dioxide and boiling between 150° and 300° C., possessing wetting out properties and soluble in water and acids.

9. In the manufacture of wetting-out agents from mineral oil fractions having a boiling range between 150 and 300° C. and containing a relatively large amount of compounds capable of being sulphonated, the process which comprises reacting said mineral oil fractions with an excess of sulphuric acid, condensing the reaction product with an alcohol and then recovering the sulphonated condensation product in the form of the sodium salt.

10. In the manufacture of wetting-out agents from the mineral oil fractions obtained by extracting mineral oil with liquid sulphur dioxide and having a boiling range between 150 and 300° C., the process which comprises reacting said mineral oil fractions with monohydrate of sulphuric acid, condensing the reaction product with an alcohol and then recovering the sulphonated condensation product in the form of the alkali metal salt.

11. In the manufacture of wetting-out agents from mineral oil fractions having a boiling range between 150 and 300° C., the process which comprises mixing said mineral oil fractions with a sulphonating agent, heating said mixture to produce a sulphonated material, separating the insoluble oil from the sulphonated material, adding alcohol to the sulphonated material thus obtained, heating the mixture of alcohol and sulphonated material to effect condensation and produce a sulphonated condensation product, and then isolating said sulphonated condensation product in the form of the alkali metal salt.

12. In the manufacture of wetting-out agents from mineral oil fractions having a boiling range between 150 and 300° C., the process which comprises mixing said mineral oil fractions with monohydrate of sulphuric acid, heating the mixture to a temperature between 60 and 65° C. to form a sulphonated material, mixing said sulphonated material with alcohol and concentrated sulphuric acid, heating this mixture to effect condensation and form a sulphonated condensation product.

13. In the manufacture of wetting-out agents from mineral oil fractions having a boiling range between 150 and 300° C., the process which comprises mixing said mineral oil fractions with monohydrate of sulphuric acid, heating the mixture to a temperature between 60 and 65° C. to form a sulphonated material, mixing said sulphonated material with alcohol and concentrated sulphuric acid, heating this mixture to a temperature between 100 and 130° C. to effect condensation and form a sulphonated condensation product.

14. In the manufacture of wetting-out agents from mineral oil fractions having a boiling range between 150 and 300° C., the process which comprises mixing one part by weight of said mineral oil fractions with more than one part by weight of a sulphonating agent, heating said mixture to produce a sulphonated material, separating the insoluble oil from the sulphonated material, adding alcohol to the sulphonated material thus obtained, heating the mixture of alcohol and sulphonated material to effect condensation and produce a sulphonated condensation product, and then isolating said sulphonated condensation product in the form of the alkali metal salt thereof.

15. In the manufacture of wetting-out agents from mineral oil fractions having a boiling range between 150 and 300° C., the process which comprises mixing one part by weight of said mineral oil fractions with more than one part by weight of monohydrate of sulphuric acid, heating the mixture to a temperature between 60 and 65° C. to form a sulphonated material, mixing said sulphonated material with alcohol and heating the mixture of alcohol and sulphonated material to a temperature between 100 and 300° C. to effect condensation and produce a sulphonated condensation product, and then isolating said sulphonated condensation product in the form of the alkali metal salt thereof.

16. In the manufacture of wetting-out agents from the mineral oil fractions obtained by extracting mineral oil with liquid sulphur dioxide and having a boiling range between 150 and 300° C., the process which comprises mixing one part by weight of such a mineral oil fraction with more than one part by weight of a sulphonating agent, heating the mixture to produce a sulphonated material, adding alcohol to the sulphonated material thus obtained, heating the mixture of alcohol and sulphonated material to effect condensation and produce a sulphonated condensation product, separating insoluble oil from the said condensation product, and then isolating said sulphonated condensation product in the form of the alkali metal salt thereof.

17. In the manufacture of wetting-out agents from the mineral oil fractions obtained by extracting mineral oil with liquid sulphuric dioxide and having a boiling range between 150 and 300° C., the process which comprises mixing one part by weight of such a mineral oil fraction with more than one part by weight of monohydrate of sulphuric acid, heating the mixture to a temperature between 60 and 65° C. to form a sulphonated material, mixing said sulphonated material with alcohol and heating the mixture of alcohol and sulphonated material to a temperature between 100 and 300° C. to effect condensation and produce a sulphonated condensation product, and then isolating said sulphonated condensation product in the form of the alkali metal salt thereof.

18. In the manufacture of wetting-out agents from the mineral oil fractions obtained by extracting mineral oil with liquid sulphur dioxide and having a boiling range between 150 and 300° C., the process which comprises mixing one part by weight of the mineral oil fraction obtained by extracting Borneo petroleum with liquid sulphur dioxide and having a boiling range of 150 to 300° C., with more than one part by weight of monohydrate of sulphuric acid, heating the mixture to a temperature between 60 and 65° C., to form a sulphonated material, adding to the sulphonated material a mixture of alcohol and concentrated sulphuric acid, heating this mixture of sulphonated material, alcohol and concentrated sulphuric acid to a temperature between 120 and 130° C. to effect condensation and form a sulphonated condensation product, separating residual insoluble oil from the said sulphonated condensation product and isolating the sulphonated condensation product by adding lime and converting the said product into the sodium salt thereof.

19. In the manufacture of wetting-out agents from the mineral oil fractions obtained by extracting mineral oil with liquid sulphur dioxide and having a boiling range between 150 and 300° C., the process which comprises mixing one part by weight of the mineral oil fraction obtained by extracting Borneo petroleum with liquid sulphur dioxide and having a boiling range of 150 to 300° C., with more than one part by weight of monohydrate of sulphuric acid, heating the mixture to a temperature between 60 and 65° C., to form a sulphonated material, cooling the reaction mass thus obtained, separating residual unsulphonated oil from the sulphonated material, adding to the sulphonated material a mixture of isopropyl alcohol and concentrated sulphuric acid, heating the mixture of sulphonated material, alcohol and sulphuric acid to a temperature between 100 and 105° C. under reflux to produce a sulphonated condensation product, cooling the reaction product thus obtained and pouring the mixture into water, neutralizing the aqueous solution thus obtained and removing excess sulphuric acid by adding lime thereto, and then isolating the sulphonated condensation product in the form of the sodium salt thereof by adding sodium carbonate to the said aqueous solution.

20. In the manufacture of wetting-out agents from mineral oil fractions having a boiling range between 150 and 300° C. and containing a relatively large amount of compounds capable of being sulphonated, the process which comprises reacting together such a mineral oil fraction, monohydrate of sulphuric acid and an alcohol, the ratio of said monohydrate of sulphuric acid to said mineral oil fraction being greater than 1:1 parts by weight, the said reaction being effected under the influence of heat, and isolating and recovering the sulphonated condensation product in the form of its alkali metal salt.

In testimony whereof we affix our signatures.

JAMES BADDILEY.
ERNEST CHAPMAN.